US007081850B2

(12) United States Patent
Small

(10) Patent No.: US 7,081,850 B2
(45) Date of Patent: Jul. 25, 2006

(54) COHERENT DETECTION OF ULTRA WIDEBAND WAVEFORMS

(75) Inventor: James G. Small, Tucson, AZ (US)

(73) Assignee: Raytheon Company, Waltham, MA (US)

( * ) Notice: Subject to any disclaimer, the term of this patent is extended or adjusted under 35 U.S.C. 154(b) by 211 days.

(21) Appl. No.: 10/860,268

(22) Filed: Jun. 3, 2004

(65) Prior Publication Data

US 2005/0270231 A1   Dec. 8, 2005

(51) Int. Cl.
*G01S 7/28* (2006.01)
(52) U.S. Cl. .................. 342/194; 342/195; 342/134; 342/137; 342/201; 342/202
(58) Field of Classification Search ........ 342/192–196, 342/134–137, 200–204
See application file for complete search history.

(56) References Cited

U.S. PATENT DOCUMENTS

| | | | | |
|---|---|---|---|---|
| 5,945,940 | A * | 8/1999 | Cuomo ....................... | 342/90 |
| 6,959,031 | B1 * | 10/2005 | Haynes et al. ............... | 375/130 |
| 6,989,782 | B1 * | 1/2006 | Walker et al. ............... | 342/134 |
| 2003/0063025 | A1 * | 4/2003 | Low et al. ................... | 341/157 |
| 2003/0128772 | A1 * | 7/2003 | Michael et al. ............. | 375/295 |
| 2004/0008617 | A1 * | 1/2004 | Dabak et al. ................ | 370/208 |
| 2004/0067765 | A1 * | 4/2004 | Wayner ....................... | 455/502 |
| 2004/0264592 | A1 * | 12/2004 | Sibecas et al. ............... | 375/267 |
| 2005/0058102 | A1 * | 3/2005 | Santhoff et al. ............. | 370/335 |
| 2005/0270231 | A1 * | 12/2005 | Small .......................... | 342/194 |
| 2006/0097907 | A1 * | 5/2006 | Fischer et al. ............. | 342/26 R |

OTHER PUBLICATIONS

"Waveform synthesis for ultra wideband radar", Gill, G.S.; Chiang, H.F.; Hall, J.Radar Conference, 1994., Record of the 1994 IEEE National Mar. 29-31, 1994 pp. 240-245.*
"Receiver operating characteristics for the coherent UWB random noise radar", Dawood, M.; Narayanan, R.M. Aerospace and Electronic Systems, IEEE Transactions on vol. 37, Issue 2, Apr. 2001 pp. 586-594.*

(Continued)

*Primary Examiner*—John B. Sotomayor
(74) *Attorney, Agent, or Firm*—Thomas J. Finn, Esq.; John E. Gunther; Karl A. Vick, Esq.

(57) ABSTRACT

A general purpose system and method for transmitting and coherently detecting UWB waveforms is predicated on the formation of conjugate pair of UWB waveforms. The in-phase and conjugate quadrature waveforms are orthogonal to each other and have the same power spectrum so that when squared and added they sum to the modulation envelope of the waveforms. By defining the waveform pair in this manner, a relatively simple and inexpensive transceiver can be used to transmit and receive the waveforms and yet preserve maximum range resolution and recover all possible energy in the returned waveforms. The transceiver transmits the in-phase UWB waveform and the conjugate quadrature UWB waveform with either a known time delay or orthogonal polarization relation. The time delay may be varied to suppress aliased return signals. A general purpose receiver detects the return waveforms, aligns them and then processes the waveforms using conventional techniques to extract target information including amplitude, phase, motion, imaging, etc. The transmission and detection of the conjugate waveforms is easily incorporated into a phased array system that comprises a plurality of transceivers.

29 Claims, 10 Drawing Sheets

OTHER PUBLICATIONS

"Post Detection Integration for Ultra-Wideband Systems with Binary Orthogonal Signaling", Dirk Dahlhaus, Communication Technology Laboratory, Swiss Federal Institute of Technology (ETH), pp. 136-141.*

"Pulse position precoding exploiting UWB power constraints", Troesch, F.; Althaus, F.; Wittneben, A. Signal Processing Advances in Wireless Communications, 2005 IEEE 6th Workshop on Jun. 5-8, 2005 pp. 395-399.*

"Research on orthogonal wavelet synthesized UWB waveform signal", Luyong Zhang; Zheng Zhou, Communications and Information Technology, 2005. ISCIT 2005. IEEE International Symposium on vol. 2, Oct. 12-14, 2005 pp. 830-832.*

"Post Detection Integration for Ultra-Wideband Systems with Binary Orthogonal Signaling", Dahlhaus, D. Ultra-Wideband, 2005. ICU 2005. 2005 IEEE International Conference on Sep. 5-8, 2005 pp. 136-141.*

* cited by examiner

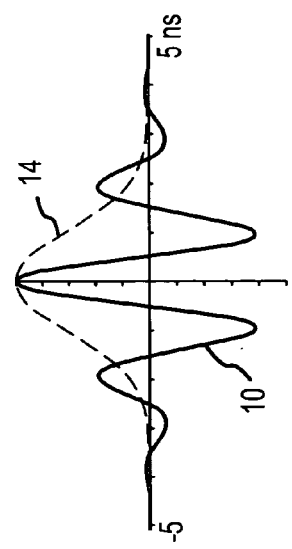
FIG.1a
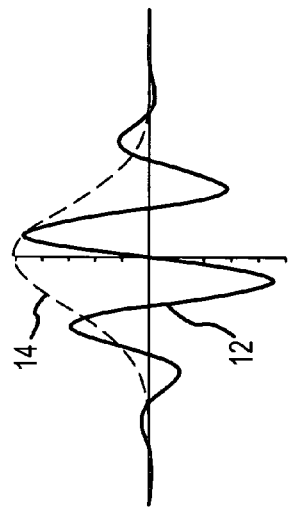
FIG.1b
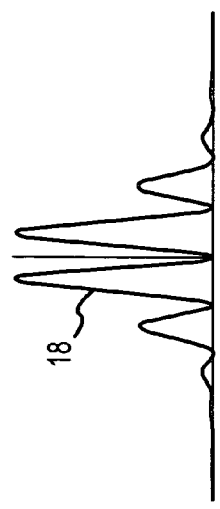
FIG.2a
FIG.2b
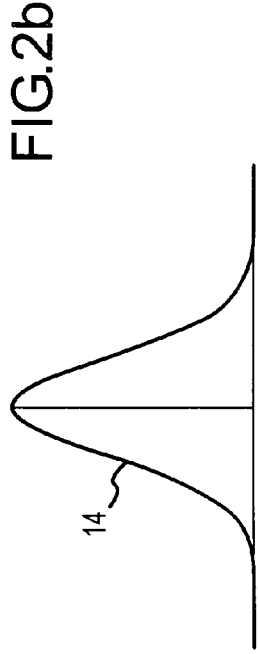
FIG.2c

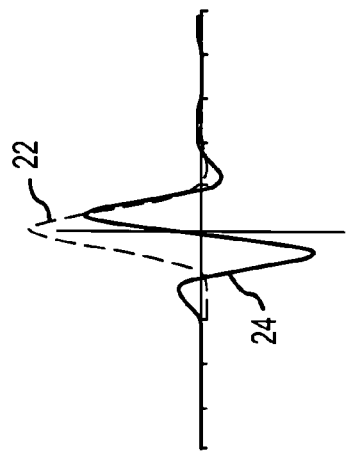
FIG.3b
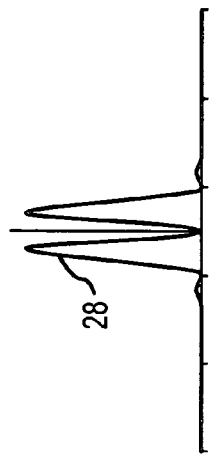
FIG.3d
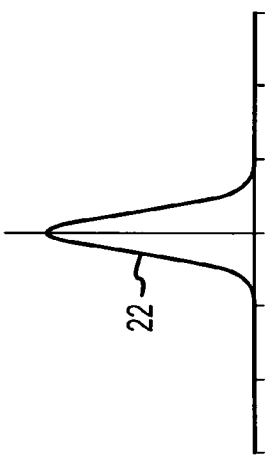
FIG.3e
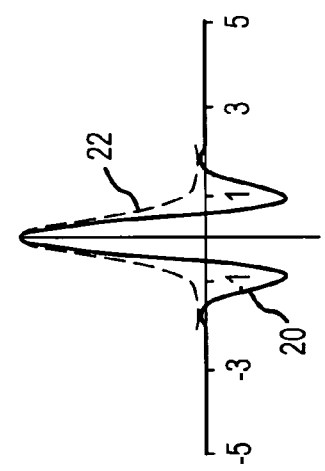
FIG.3a
FIG.3c

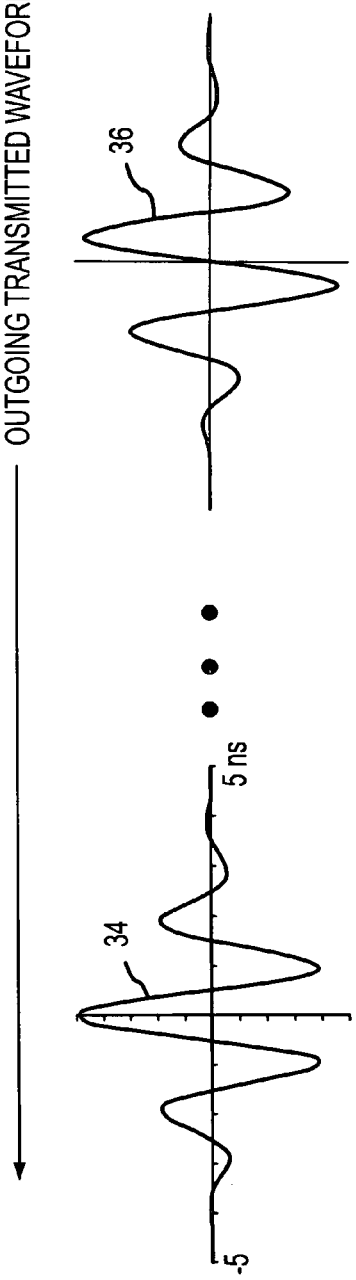
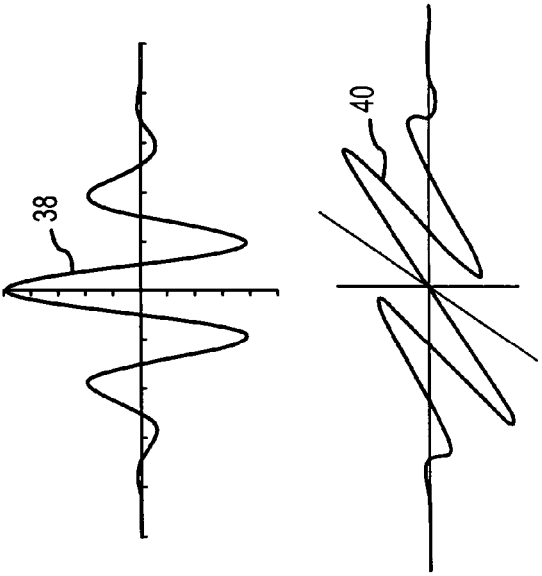
FIG.5a
FIG.5b

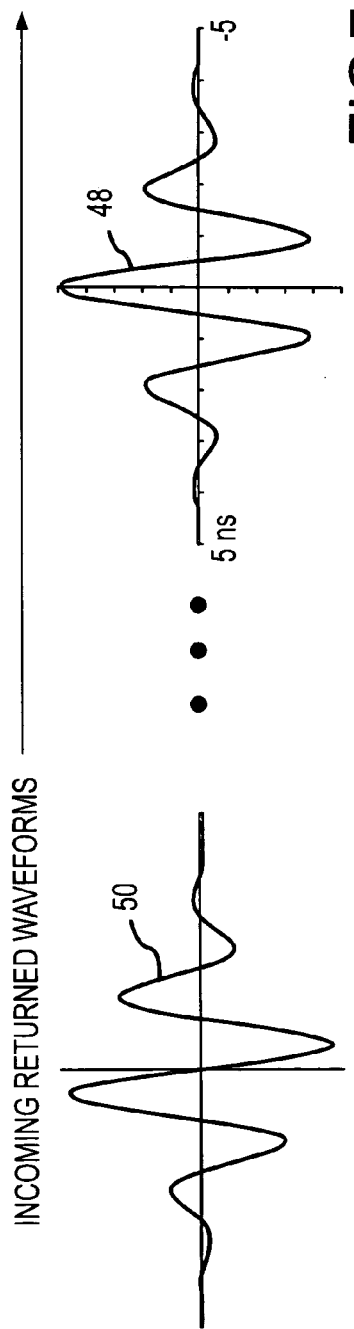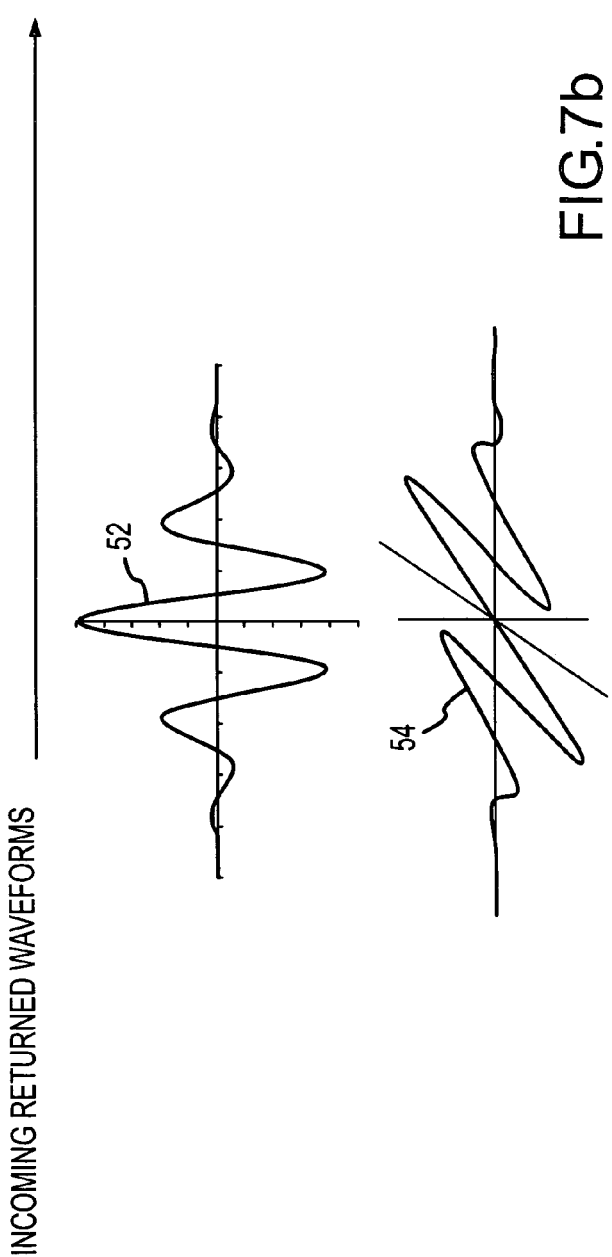

COHERENT DETECTION OF ULTRA WIDEBAND WAVEFORMS

BACKGROUND OF THE INVENTION

1. Field of the Invention

This invention relates to the transmission and coherent detection of ultra wideband (UWB) waveforms in radar, sonar and communications systems, and more specifically to a method of transmitting and efficiently detecting self-conjugating waveforms using a general-purpose receiver.

2. Description of the Related Art

Research and development in the field of wideband radar systems has been undertaken for many years. The impetus for this development was rooted in the successful application of high power instrumentation radars for research in ballistic missile defense and satellite surveillance. Current wideband imaging radars provide considerable real-time discrimination and combat identification capability. Advanced signal processing methods have significantly improved the resolution of processed radar return signals, further improving the state-of-the-art in wideband radar technology. The ability to identify targets and accurately estimate their size and shape is critical to many applications.

World War II era radar transmitted simple pulsed signals and detected only the power of a pulse returned from targets. Modern radars may transmit much more complex waveforms. To extract all possible information contained in the returning signals, many modern radars use coherent detection to extract both amplitude and phase information. The additional information can be used to, for example, measure the closing velocity of the target or form terrain images in synthetic aperture radars (SARs).

Typical relatively wideband radar systems transmit a burst of radio frequency energy which consists of many cycles at a center frequency. Such a wideband pulse is characterized by $\Delta f/f \ll 1$ where f is the center frequency and $\Delta f$ is the pulse bandwidth or 1/(pulse duration). For example, a 30 ns pulse at 10 Ghz will transmit 300 cycles and $\Delta f/f = 1/300$. The return signal resembles a sine or cosine wave within the pulse envelope. To capture all possible received energy, the receiver coherently detects both in-phase and quadrature signals by mixing the received signal with cosine and sinusoidal local oscillators. The amplitude information is extracted by squaring and adding the in-phase and quadrature detected signals to recover the target's response. Phase information can be derived mathematically by calculating the arctangent of the ratio of the in-phase to quadrature signal amplitudes. Continuing with the example, flying at the speed of light the 30 ns, 10 Ghz pulse has a pulse length of 9 meters. This signal will provide a range uncertainty to the target of approximately 9 meters in the round trip distance or 4.5 meters in the one-way range to the target.

To achieve fine range resolution, some radar systems utilize coded waveforms with large time-bandwidth products. Wideband "chirp" waveforms are commonly used in practice due to their ease of generation and processing in the radar receiver. By mixing the radar return signals with a replica of the transmitted signal, a baseband signal is produced with frequency components that are proportional to the relative range between scattering centers on the target. The ALCOR C-band radar utilizes a wideband chirp waveform with a bandwidth of 512 MHz providing ALCOR with a range resolution capability of about 53 cm. Kwajalein's millimeter-wave radar (MMW) can operate at the Ka- and W-bands and is capable of a transmission bandwidth of 2000 MHz, providing an impressive 14 cm range resolution capability (U.S. Pat. No. 5,945,940).

Another approach is to transmit simple ultra widband (UWB) pulses which consist of a single-cycle or a few-cycle waveform where the bandwidth is comparable to the center frequencey, i.e., $\Delta f/f \approx 1$. Fourier theory dictates that the achievable resolution is inversely proportional to the total waveform length. This means that range resolution improves as radar bandwidth increases. For example, a 1 ns pulse at a center frequency of 1 Ghz would have approximately one cycle of oscillation and would provide a one-way range resolution of 0.15 meters or about 6 inches. With a 10 GHz center frequency, a single-cycle waveform could provide resolution 10-times finer or 0.6 inches. UWB pulses can be generated using very high speed switching, harmonic oscillators (see U.S. Pat. Nos. 5,146,616 and 5,239,309) or by chopping sine or cosine signals.

The problem with UWB pulses is how to detect them without expensive special purpose hardware and still recover the maximum energy and range resolution. The coherent detector described above is only effective for detecting relatively narrow band signals which have many cycles and are thus are approximately sinusoidal. The power spectrum of a returned UWB pulse is very broad and thus would only appear as a short transient in the noise of the detector. Typical UWB systems utilize some type of special purpose "matched" reciever such as a correlator, which can be be very expensive. Matched recievers must be designed for a specific UWB waveform. Because the correlations are about twice as long as the original waveforms, the range resolution is degraded by at least a factor of two, negating some of the advantage of UWB waveforms. In addition, because the correlation operation is a non-linear function interference problems may arise when several overlapping pulses are simultaneously returned to the correlator.

To avoid the complexity and expense of true UWB systems, Cuomo in U.S. Pat. No. 5,945,940 proposes a radar system that coherently combines signals from independent upper- and lower-sub-band radars, mutually coheres the sub-band radar signals, and performs model fitting and parameter estimation to obtain ultra-wideband data signatures from a target. Signal processing models are used to compensate for potential lack of mutual coherence between the various sub-bands. An ultra-wideband signal model is fitted to the sparse sub-band measurements to accurately characterize ultra-wideband target scattering and provide for meaningful interpolations or extrapolations outside of the measurement sub-hands.

Before UWB radar will become widely accepted, a general purpose approach for transmitting and detecting simple UWB pulses is needed that preserves both range resolution and recovers all possible energy.

SUMMARY OF THE INVENTION

The present invention provides a general purpose system and method for transmitting and coherently detecting UWB waveforms that preserves range resolution and recovers all possible energy in the returned waveforms.

This is accomplished by generating a conjugate pair of UWB waveforms. The in-phase and conjugate quadrature waveforms are mathematically orthogonal to each other and have the same power spectrum so that when squared and added they sum to the modulation envelope of the waveforms. By defining the waveform pair in this manner, a relatively simple and inexpensive transceiver can be used to transmit and receive the pulses and yet preserve maximum range resolution and recover all possible energy in the returned waveforms. The transceiver transmits the in-phase UWB waveform and the conjugate quadrature UWB waveform with either a known time delay or polarization relation. The time delay or polarization relation may be varied to suppress aliased return signals. A general purpose receiver detects the return waveforms, aligns them and then processes the waveforms using conventional techniques to extract target information including amplitude, phase, motion, imaging, etc.

The transmission and detection of the conjugate waveforms are easily incorporated into a phased array system that comprises a plurality of transceivers. In transmit mode, each antenna element is driven by a separate UWB transmitter. A central beam forming generator commands each transmitter to transmit either the in-phase or conjugate quadrature waveform at a specific time. Beam steering is accomplished by appropriately delaying the transmitted signal at each antenna. For a linear array, beam steering amounts to a ripple fire of the transmitters. After each transmitter transmits, it also starts a clock to record the returning signals from its associated receiver. The in-phase and conjugate quadrature returns are sequentially stored in the receiver memories. To form coherent beams in receive mode, the separate receiver memories must be combined with additional appropriate digital time delays.

These and other features and advantages of the invention will be apparent to those skilled in the art from the following detailed description of preferred embodiments, taken together with the accompanying drawings, in which:

BRIEF DESCRIPTION OF THE DRAWINGS

FIGS. 1a and 1b are diagrams of a conjugate pair of UWB waveforms;

FIGS. 2a through 2c are diagrams illustrating how the modulation envelop can be recovered with all possible energy and maximum resolution from the conjugate pair;

FIGS. 3a through 3e are diagrams of another conjugate pair of single-cycle UWB waveforms;

FIGS. 5a and 5b are diagrams illustrating the transmission of the in-phase and conjugate quadrature waveforms with a known delay and a known polarization, respectively;

FIGS. 7a and 7b are diagrams illustrating the receipt of the incoming waveforms with a known time delay and polarization, respectively;

DETAILED DESCRIPTION OF THE INVENTION

Figure 4:
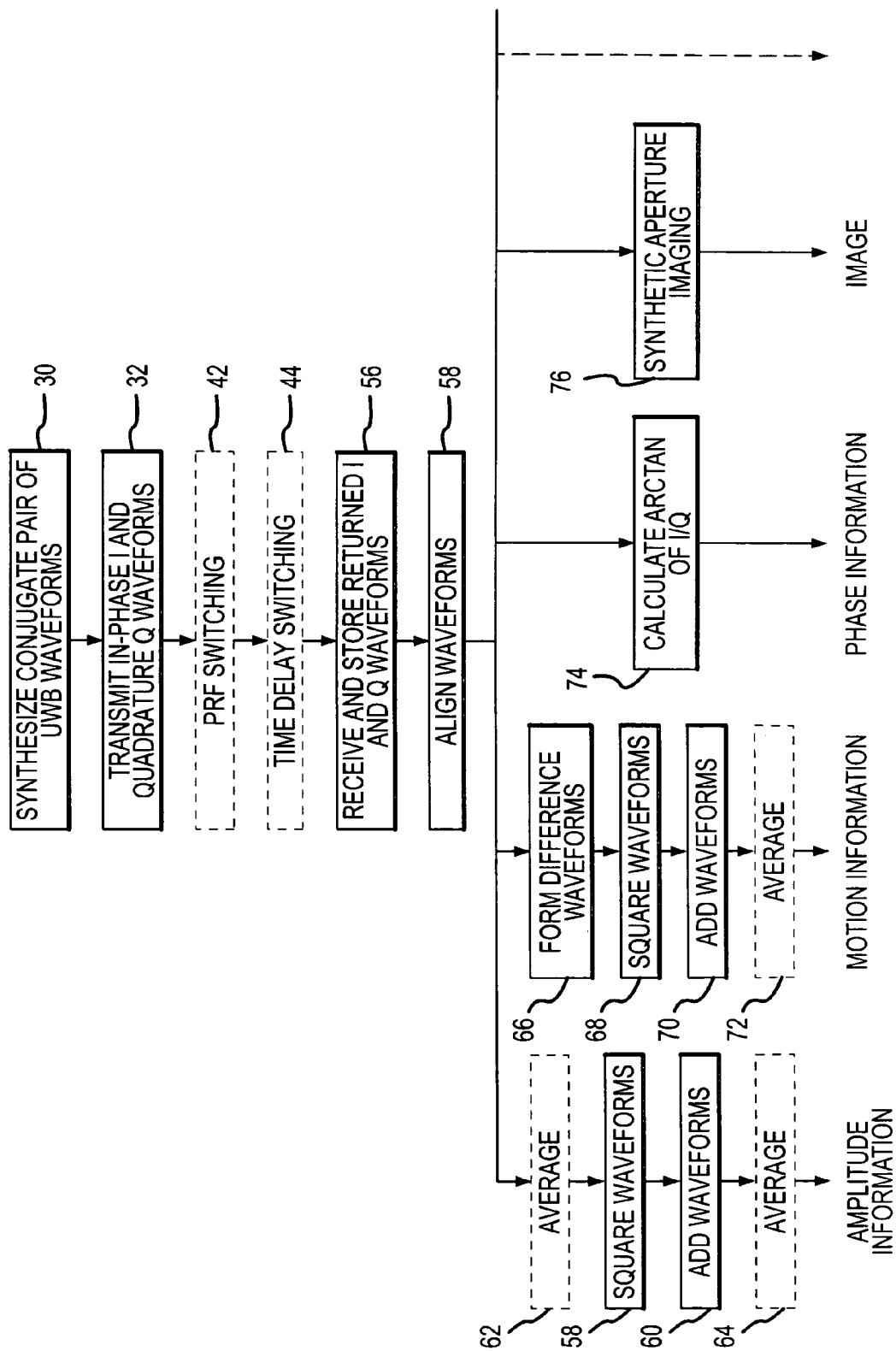
FIG. 4 is a flowchart describing the generation, transmission and detection of the in-phase and conjugate quadrature UWB waveforms.

The present invention provides a general purpose system and method for transmitting and coherently detecting UWB waveforms that preserves range resolution and recovers all possible energy in the returned waveforms. This approach can be used in electromagnetic radar systems, acoustic sonar systems, medical and geological imaging systems and communications systems.

As illustrated in FIGS. 1a and 1b, the current approach is predicated on the formation of a conjugate pair of UWB waveforms consisting of an in-phase UWB waveform 10 and a conjugate quadrature UWB waveform 12. A "conjugate" pair is defined as being mathematically orthogonal to each other and having the same power spectrum. In the example shown, the in-phase (I) waveform 10 is a cosine wave weighted by a Gaussian modulation envelope 14. The conjugate quadrature (Q) waveform 12 is a sine wave weighted by the same Gaussian modulation envelope 14. There exist an infinite combination of orthogonal waveforms and modulation envelopes that can produce a conjugate pair. Furthermore, the use of conjugate waveforms is a linear process so pulses can be superimposed without interference. Although modern digital waveform synthesis methods can achieve a very high degree of spectral purity and phase control when constructing these waveforms it is to be understood that the waveforms may be only "approximately" orthogonal and have "approximately" the same power spectrum.

It is well known from Fourier's Theorem, that any repeating waveform, such as a complicated but repeating pulse, can be synthesized from a discrete series of sinusoidal and cosinusoidal harmonics each having particular amplitudes. To calculate the form of a conjugate pair of waveforms, one may describe the first or I-waveform as a Fourier series. An I-waveform may be any convenient repeating waveform including but not limited to a single-cycle UWB waveform. The second or Q-waveform is then calculated by replacing each cosine term in the Fourier Series for the I waveform with a similar-amplitude sine term and each sine term with a similar-amplitude cosine term. This is one practical example demonstrating the synthesis of a conjugate waveform pair.

By defining the conjugate pair in this manner, we have created a pair of UWB waveforms that preserve maximum range resolution and make it possible to recover all of the energy in the waveforms. These key properties are illustrated in FIGS. 2a through 2c in which the squared I waveform 16 and the squared Q waveform 18 are summed together to reproduce the modulation envelope 14. This means that all of the energy is preserved in the conjugate pair. Furthermore, because the modulation envelope has not spread in time, as it would in a conventional matched correlator, maximum range resolution is preserved. If the I and Q waveforms are only approximately orthogonal or have only approximately the same power spectrum some degradation to the ability to recover all the energy or to maintain maximum range resolution will occur.

The example shown in FIGS. 1 and 2 clearly demonstrates that a conjugate pair can be defined for UWB waveforms containing a few cycles of an underlying signal, e.g. 5 cycles or less. As shown in FIGS. 3a through 3e the same principles apply equally to single cycle waveforms. The I waveform 20 is formed by weighting a single cycle of a cosine by a modulation envelop 22. Similarly the Q waveform 24 is formed by weighting a single cycle of a sine by a modulation envelop 22. Summing the squared I waveform 26 and squared Q waveform 28 reproduces the modulation envelop 22. This mathematical property arises from the fact that, at any point in time under the modulation envelope, sine-squared plus cosine-squared equals one.

In addition to preserving signal energy and resolution, the use of a conjugate pair facilitates a relatively simple process for transmitting and receiving the waveforms as described in FIG. 4. A conjugate pair of UWB waveforms are synthesized (step 30) using, for example, the known techniques of high speed switching, harmonic series generation (see U.S. Pat. Nos. 5,146,616 and 5,239,309) or chopping of sine and cosine waves. The I and Q waveforms are then transmitted towards a target (step 32). The target could be an aircraft, vehicle, missile, underwater object, human tissue, geologic formation, etc.

The I and Q waveforms must be transmitted in such a way that they can be received and recovered independently. As shown in FIG. 5a, one approach is to transmit the I and Q waveforms 34 and 36, respectively, sequentially with a known time delay. There are some signal-to-noise-ratio advantages if the returning signals from the I waveform do not overlap appreciably with the returning signals from the Q waveform. The disadvantage of long waits between transmitting the two waveforms is that the target may move appreciably (more than one quarter wavelength) during the time between waveforms. In the case of appreciable movement, the two returns may decorrelate leading to reduced detection sensitivity. This problem occurs for fast moving targets at long range. To counter this problem, the two waveforms are suitably transmitted with minimal delay. It may be possible to transmit the waveforms simultaneously with no delay but it is expected that some minimal delay, e.g., at least one range bin (pulse width), will simplify the process of recovering the return waveforms and improve SNR.

As shown in FIG. 5b, another approach is to transmit the I and Q waveforms 38 and 40, respectively, simultaneously with a known orthogonal polarization relation. If the waveforms are transmitted and received via a pair of antenna elements oriented with the desired polarization, e.g. vertical/horizontal or right/left circular, the return signals can be recovered independently. If the waveforms are not orthogonal, it is equivalent to transmitting pusles with less than one range bin time delay, which will complicate the process of separating the return signals and will reduce the SNR of any detected signal.

Figure 6:
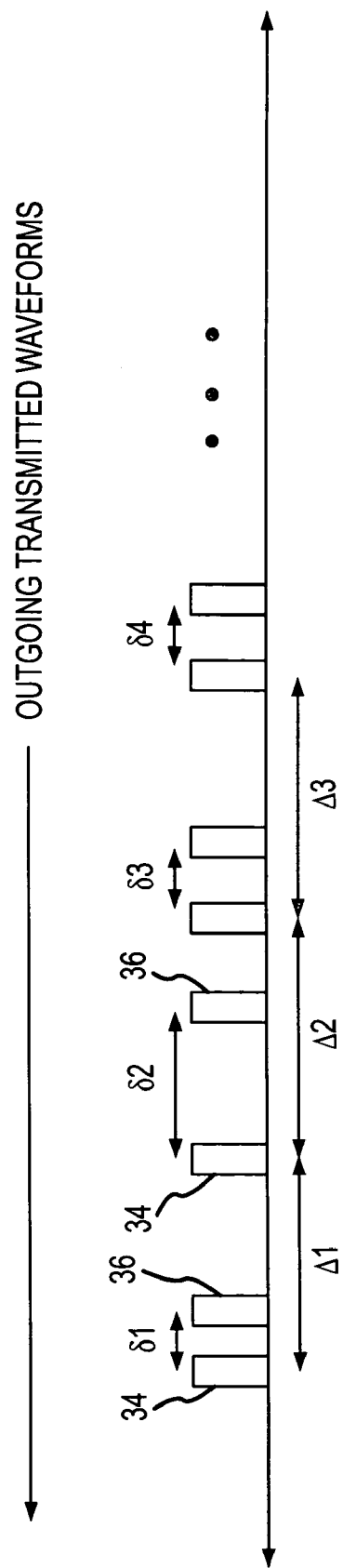
FIG. 6 is a diagram of a pulse train using PDF switching and time delay switching.
Figure 8:
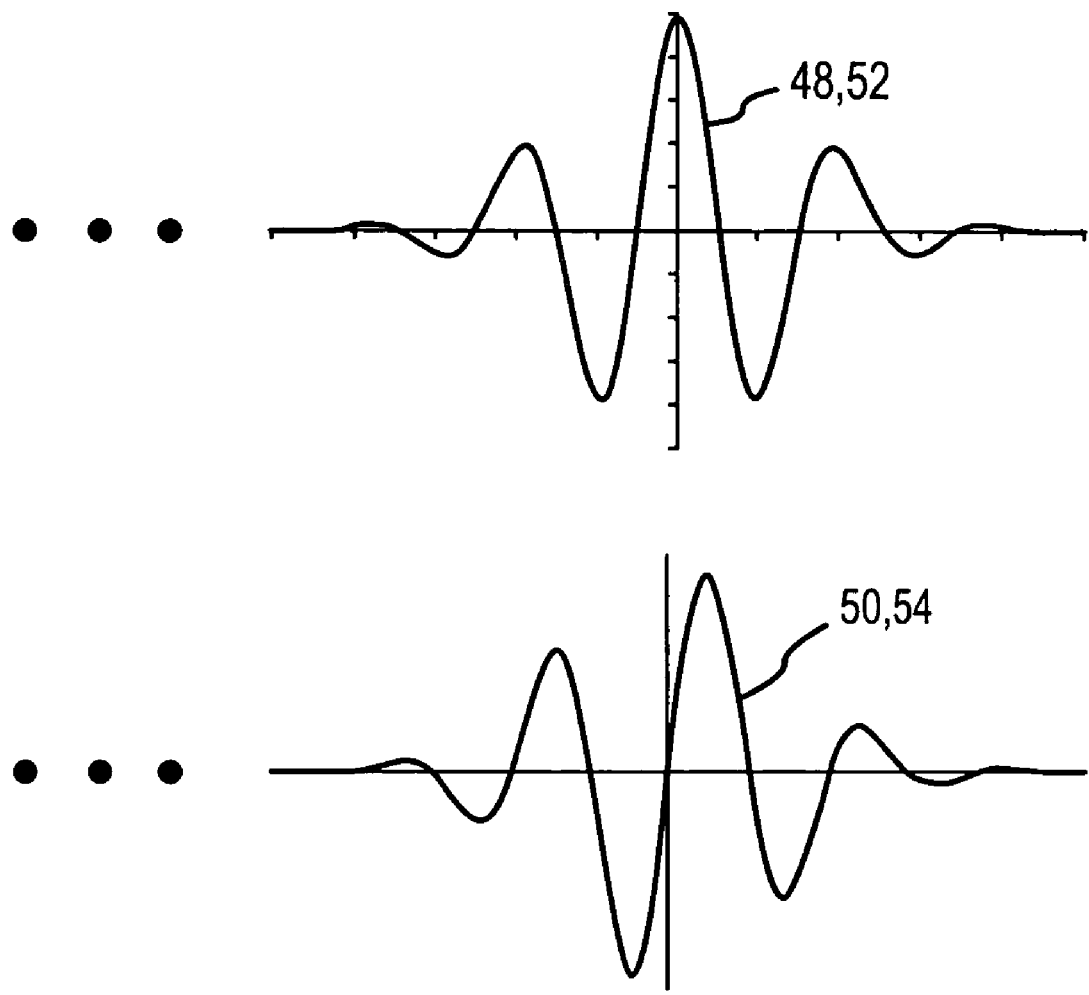
FIG. 8 is a diagram of the time shifted and aligned waveforms.

Aliasing is a problem faced by all medium and high Pulse Repetition Frequency (PRF) systems. To combat this problem, known radar systems vary the delay between pulses to identify false or aliased detections. This is called PRF switching. In the context of transmitting a sequence of I and Q pulses 34 and 36, PRF switching is done by varying the time delays $\Delta 1, \Delta 2, \ldots \Delta n$ between successive I pulses (step 42). Alternately or in combination with PRF switching, the time delays $\delta 1, \delta 2, \ldots \delta n$ between the I and Q pulses 34 and 36 can be varied to the same effect (step 44) as shown in FIG. 6a. In the case where the I and Q pulses 38 and 40 are transmitted simultaneously but with orthogonal polarizations, traditional PRF switching can be used. Alternately, the waveforms may be transmitted with an orthogonal polarization and variable time delays.

The transmitted I and Q waveforms reflect off of the target and return waveforms; I 48 and Q 50 in the time delay case (FIG. 7a) and I 52 and Q 54 in the polarization case (FIG. 7b), are received and stored in memory (step 56). As shown the return waveforms are a perfect replica of the outgoing waveforms, which in an idealized environment might happen if the target was a stationary wall. In actual situations the returned waveform would represent the outgoing waveform convolved with the impulse response of the target. To process the I and Q waveforms to extract amplitude, phase, motion, etc. information, the waveforms need to be aligned (step 58). When the I and Q waveforms are transmitted sequentially this is accomplished by time shifting one of the return waveforms by the known time delay. When the I and Q waveforms are transmitted simultaneously with orthogonal polarizations this is done inherently by the antenna elements.

Once aligned, the I and Q return waveforms are analogous to the in-phase and quadrature signals generated by the local oscillators in a conventional narrowband coherent detector. Thus, all of the processing techniques developed for standard coherent detection can be applied to the conjugate pair of UWB waveforms. This is a tremendous benefit that both simplifies and enhances the use of UWB waveforms. For example, amplitude information is extracted by squaring the I and Q waveforms (step 58) and adding them together (step 60). To improve SNR, the I and Q waveforms may be averaged over a number of pulses (step 62) and/or the recovered modulation envelop may be averaged over a number of pulses (step 64). A standard coherent change detection algorithm can be used to extract motion information. Difference waveforms for the I and Q return waveforms are formed (step 66). These difference I and Q waveforms are then squared (step 68), added together (step 70) and possibly averaged (step 72). Phase information is extracted by calculating the arctan of the ratio of the I waveform to the Q waveform (step 74). Synthetic aperture imaging algorithms can be applied to the returned signals (step 76) to generate images of the target. These are but a few of standard processing techniques that are available to process the recovered conjugate waveform pair.

Figure 9A:
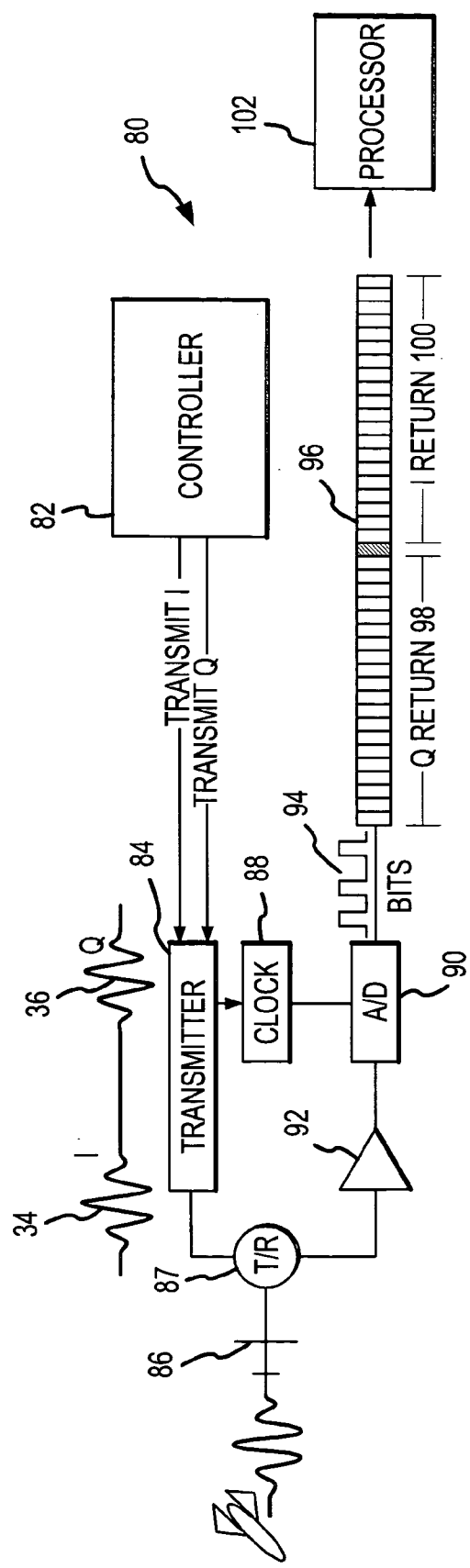
FIGS. 9a and 9b are block diagrams of two embodiments of a transceiver.
Figure 9B:
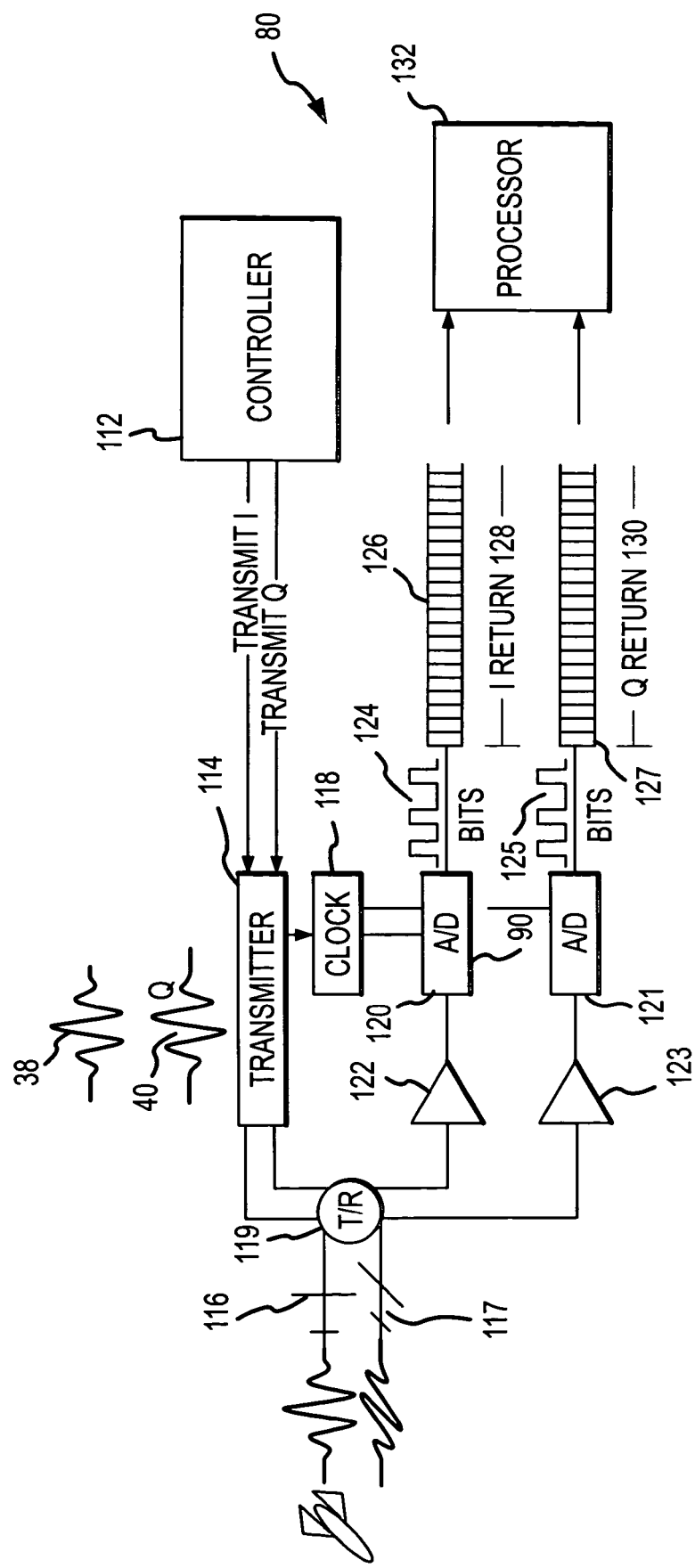

By defining the waveform pair in this manner, a relatively simple and inexpensive transceiver 80 of the type shown in FIGS. 9a and 9b can be used to transmit and receive the I and Q pulses and yet preserve maximum range resolution and recover all possible energy in the returned waveforms.

As shown in FIG. 9a, transceiver 80 is configured to transmit I and Q pulses sequentially with a known time delay. A controller 82 generates a pair of command signals separated by the desired time delay that cause a transmitter 84 to generate and transmit I and Q pulses 34 and 36 via antenna element 86 that is controlled by a T/R switch 87 to alternately send and receive signals. A clock 88 is synchronized to the transmission of the I pulse and starts clocking an A/D converter 90 to sample the return signal, which is amplified by gain element 92, convert it into digital bits 94 and store the bits in memory 96. The I return 98 and Q return 100 are stored sequentially in memory 96 as they are received. A processor 102, knowing when the I pulse was transmitted and the time delay between the pulses, time shifts the I and Q returns so that they are aligned. The processor can than process the aligned I and Q returns to extract the desired information.

As shown in FIG. 9b, transceiver 80 is configured to transmit I and Q pulses 38 and 40 simultaneously with a known polarization relation. A controller 112 generates a command signal that causes a transmitter 114 to generate and transmit I and Q pulses 38 and 40 via antenna element 116 and 117, which impart a known polarization relation on the waveforms. For example, the antenna may transmit orthogonal linear polarizations or right and left circular polarizations respectively for the I and Q signals or some orthogonal combination thereof (such as elliptical polarizations). The antenna elements are controlled by a T/R switch 119 to alternately send and receive signals. A clock 118 is synchronized to the transmission of the pulses and starts clocking an A/D converters 120 and 121 to sample the I and Q return signals, which are amplified by gain element 122 and 123, convert each signal into digital bits 124 and 125 and store the bits in memories 126 and 127. The I return 128 and Q return 130 are stored in parallel in memory 96 as they are received and thus are naturally aliened.

If orthogonal polarizations are modulated to suppress aliasing then the processor must appropriately time delay and add the received signals in such a manner as to separate the orthogonal signals into separate receiving channels. For example, a right-circular polarized signal may be received by two orthogonal linear antennas if the signal from one antenna is delayed in phase by 90 degrees and then added to the signal from the second antenna. The same two linear antennas can simultaneously receive a left-circular signal if the signal from one antenna is advanced in phase by 90 degrees and then added to the signal from the second antenna. A system might dynamically switch from circular to linear polarizations on a pulse-to-pulse basis. To recover the returned signals when dynamic polarization switching is used, the receiver processor must be preprogrammed to account for changes in relative time and/or phase delays between I and Q signals. For all time shifted I and Q signals (whether polarization orthogonal or not) a processor 132 processes the aligned I and Q returns to extract the desired information.

Figure 10:
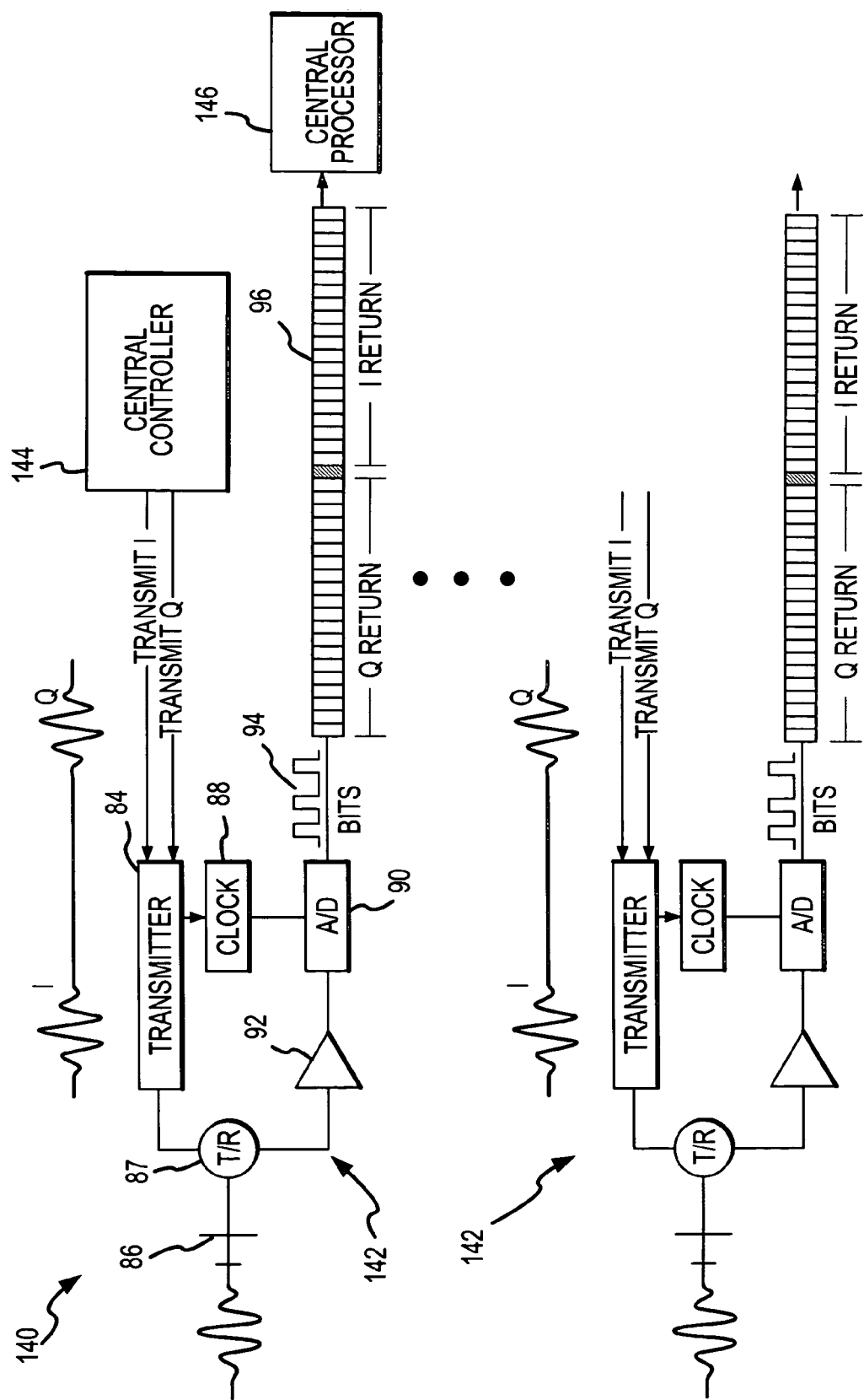
FIG. 10 is a block diagram of a phased array transceiver.

The transmission and detection of the conjugate waveforms is easily incorporated into a phased array system 140 as shown in FIG. 10 that comprises a plurality of transceivers 142 of the type shown in FIG. 9a. Beam steering is accomplished by delaying the I pulses with respect to each other across the array. In transmit mode, each antenna element 86 is driven by a separate UWB transmitter 84. A central controller 144 generates command signals for each transmitter to transmit either the in-phase or conjugate quadrature waveform at a specific time. For a linear array, beam steering amounts to a ripple fire of the transmitters. After each transmitter transmits, it also starts a clock 88 to record the returning signals from its associated receiver. The in-phase and conjugate quadrature returns are sequentially stored in the receiver memories 96. To form coherent beams in receive mode, a central processor 146 combines the separate receiver memories with additional appropriate digital time delays.

While several illustrative embodiments of the invention have been shown and described, numerous variations and alternate embodiments will occur to those skilled in the art. Such variations and alternate embodiments are contemplated, and can be made without departing from the spirit and scope of the invention as defined in the appended claims.

I claim:

1. A method for coherently detecting ultra wideband (UWB) waveforms, comprising:
    transmitting an in-phase UWB waveform;
    transmitting a conjugate quadrature UWB waveform, wherein said in-phase and conjugate quadrature UWB waveforms are orthogonal to each other and have the same power spectrum so that when squared and added they sum to a modulation envelope of the waveforms;
    receiving the returned in-phase and conjugate quadrature UWB waveforms; and
    aligning the in-phase and conjugate quadrature UWB waveforms.

2. The method of claim 1, wherein said in-phase and conjugate quadrature UWB waveforms comprise less than 5 cycles of a signal.

3. The method of claim 1, wherein said in-phase and conjugate quadrature UWB waveforms comprise a single cycle.

4. The method of claim 1, wherein said in-phase UWB waveform is the product of a sine wave and the modulation envelope and the conjugate quadrature UWB waveform is the product of a cosine wave and the modulation envelop.

5. The method of claim 1, wherein the UWB waveforms are transmitted simultaneously with an orthogonal polarization relation, said waveforms being aligned by receiving the waveforms with a pair of antenna elements.

6. The method of claim 1, further comprising:
    processing the aligned in-phase and conjugate quadrature UWB waveforms to extract information in the returned waveforms.

7. A method for coherently detecting ultra wideband (UWB) waveforms, comprising:
    Sequentially transmitting an in-phase UWB waveform and a conjugate quadrature UWB waveform with a known time delay;
    Receiving the returned in-phase and conjugate quadrature UWB waveforms; and time shifting one of said waveforms by the known time delay to align the in-phase and conjugate quadrature UWB waveforms.

8. The method of claim 7, wherein a sequence of in-phase and conjugate quadrature UWB waveform pairs are transmitted, further comprising:
    varying the known time delay in the different waveform pairs.

9. A method for coherently detecting ultra wideband (UWB) waveforms, comprising:
    transmitting a sequence of in-phase and conjugate quadrature UWB waveform pairs, each pair of UWB being transmitted simultaneously with an orthogonal polarization relation;
    varying a known time delay between the transmission of the in-phase and conjugate quadrature UWB waveform pairs in the sequence; and
    receiving the waveform pairs with a pair of antenna elements to align the in-phase and conjugate quadrature UWB waveforms.

10. A method for coherently detecting ultra wideband (UWB) waveforms, comprising:
    transmitting an in-phase UWB waveform;
    transmitting a conjugate quadrature UWB waveform;
    receiving the returned in-phase and conjugate quadrature UWB waveforms;
    aligning the in-phase and conjugate quadrature UWB waveforms; and
    squaring and summing the aligned in-phase and conjugate quadrature UWB to recover a modulation envelop of the waveforms.

11. A method for coherently detecting ultra wideband (UWB) waveforms, comprising:
    transmitting a plurality of in-phase and conjugate quadrature UWB waveform pairs in respective parallel channels to form a phased array beam;
    controlling a time delay between the transmission of the waveform pairs from channel-to-channel to steer the phased array beam;
    receiving the returned in-phase and conjugate quadrature UWB waveform pairs; and
    aligning the in-phase and conjugate quadrature UWB waveforms in the received waveform pairs.

12. A method for transmitting ultra wideband (UWB) waveforms, comprising:
    transmitting an in-phase UWB waveform; and
    transmitting a conjugate quadrature UWB waveform with a known time delay or orthogonal polarization with respect to the in-phase UWB waveform, wherein said in-phase and conjugate quadrature UWB waveforms are orthogonal to each other and have the same power spectrum so that when squared and added they sum to a modulation envelope of the waveforms.

13. The method of claim 12, wherein said in-phase and conjugate quadrature UWB waveforms comprise less than 5 cycles of a signal.

14. The method of claim 12, wherein a sequence of in-phase and conjugate quadrature UWB waveform pairs are transmitted, further comprising:
varying the known time delay in the different waveform pairs.

15. The method of claim 12, wherein the conjugate quadrate UWB waveform is transmitted with a known time delay equal to at least the width of the in-phase UWB waveform.

16. A method for detecting ultra wideband (UWB) waveforms, comprising:
receiving a first return signal for an in-phase UWB waveform;
receiving a second return signal for a conjugate quadrature UWB waveform, wherein said in-phase and conjugate quadrature UWB waveforms are orthogonal to each other and have the same power spectrum so that when squared and added they sum to a modulation envelope of the waveforms; and
aligning said first and second return signals.

17. The method of claim 16, wherein the UWB waveforms are received sequentially with a known time delay, said waveforms being aligned by time shifting one of said waveforms by the known time delay.

18. The method of claim 17, wherein the known time delay is varied.

19. The method of claim 16, wherein the UWB waveforms are received simultaneously with an orthogonal polarization relation, said waveforms being aligned by receiving the waveforms with a pair of orthogonal antenna elements.

20. The method of claim 16, further comprising:
processing the aligned in-phase and conjugate quadrature UWB waveforms to extract information in the returned signals.

21. An ultra wideband (UWB) transceiver, comprising:
a transmitter for generating an in-phase UWB waveform and a conjugate quadrature UWB waveform;
a controller for generating command signals to the transmitter to transmit said UWB waveforms;
an antenna element for transmitting the UWB waveforms and receiving return waveforms;
an A/D converter that samples the return signals to generate digital return waveforms;
a clock that controls the A/D converter to initiate sampling in sync with the transmission of the in-phase UWB waveform;
a digital memory for storing the digital return waveforms; and
a processor for processing the digital return waveforms.

22. The transceiver of claim 21, wherein said in-phase and conjugate quadrature UWB waveforms are transmitted sequentially with a known time delay, said processor shifting the digital return waveforms stored in memory to align them as if they were transmitted simultaneously.

23. The transceiver of claim 22, wherein the controller varies the known time delay.

24. The transceiver of claim 21, wherein said in-phase and conjugate quadrature UWB waveforms are transmitted and received simultaneously via an orthogonal pair of said antenna elements, said transceiver comprising a pair of the A/D converters that sample the return signals and store the time-aligned digital return waveforms in said digital memory.

25. A ultra wideband (UWB) phased array system, comprising:
a plurality of transceivers in different channels that transmit in-phase and conjugate quadrature UWB waveforms, receive the return waveforms from a target and align them;
a central controller that issues command signals to the transceivers to delay the transmission of the waveforms from channel-to-channel to steer a beam; and
a central processor that processes the aligned waveforms from the transceivers to extract information regarding the target.

26. The phased array system of claim 25, wherein each said transceiver transmits the in-phase and conjugate quadrature UWB waveforms sequentially with a known time delay and time shifts the return waveforms to align them.

27. The phased array system of claim 26, wherein in each channel the known time delay between the in-phase and conjugate quadrature UWB waveforms is varied.

28. The phased array system of claim 25, wherein each said transceiver comprises a pair of orthogonal antenna elements that transmit and receive the in-phase and conjugate quadrature UWB waveforms with an orthogonal polarization.

29. The phased array system of claim 25, wherein each said transceiver comprises: comprising:
a transmitter for generating the in-phase UWB waveform and conjugate quadrature UWB waveforms;
a controller for generating command signals to the transmitter to transmit said UWB waveforms;
an antenna element for transmitting the UWB waveforms and receiving return waveforms;
an A/D converter that samples the return signals to generate digital return waveforms;
a clock that controls the A/D converter to initiate sampling in sync with the transmission of the in-phase UWB waveform;
a digital memory for storing the digital return waveforms; and
a processor for processing the digital return waveforms.

* * * * *